United States Patent

[11] 3,604,885

[72] Inventor  Kiyoshi Inoue
               100 Sakato, Kavaski, Kanagawa, Japan
[21] Appl. No. 838,575
[22] Filed     July 2, 1969
[45] Patented  Sept. 14, 1971
[32] Priority  July 5, 1968, Sept. 19, 1968, Mar. 8, 1969
[33]           Japan
[31]           43/47406, 43/67894 and 44/17878
               Continuation-in-part of application Ser. No.
               682,824, Nov. 14, 1967, now Patent No.
               3,359,755, which is a continuation-in-part
               of application Ser. No. 493,473, Oct. 6,
               1965, now Patent No. 3,360,683.

[54] EDM POWER SUPPLY FOR GENERATING SELF-ADAPTIVE DISCHARGE PULSES
     47 Claims, 13 Drawing Figs.

[52] U.S. Cl. ........................................ 219/69 P
[51] Int. Cl. ....................................... B23p 1/08
[50] Field of Search ............................ 219/69 C,
                                                  69 F, 69 G, 69 P

[56]                References Cited
                UNITED STATES PATENTS
2,979,639  4/1961  Williams et al. ............... 219/69 P UX
3,052,817  9/1962  Branker ......................... 219/69 C
3,292,040  12/1966 Ullmann et al. ............... 219/69 P X
3,419,754  12/1968 Schierholt ..................... 219/69 C X
Primary Examiner—R. F. Staubly
Attorney—Karl F. Ross ABSTRACT: An EDM (electric-discharge machining) power supply system for generating self-adaptive discharge pulses wherein an electrode is spacedly juxtaposed with a workpiece across a discharge gap while a dielectric liquid coolant is passed therethrough. The electrode and the workpiece are relatively displaced during the machining of the latter to maintain the gap spacing generally constant via a servomechanism. According to the invention, there is applied across the electrode and the workpiece a direct-current arc-striking voltage sufficient to initiate discharge across the gap while permitting the voltage to build up thereacross to a level constituting a function of conductivity characteristics of the gap and to decay with a discharge across the gap. An analog signal is derived across the gap and represents the voltage buildup and decay thereacross. Machining current flow through the gap across the electrode and the workpiece is triggered by a digital signal derived when the analog signal exceeds a threshold value and initiation of the discharge is induced by the arc-striking voltage. A second digital condition terminates the machining current flow which is controlled by a semiconductive power switch turned on and off instantaneously in dependence upon the digital conditions. A limited current high-voltage source is connected in a closed loop circuit with the electrode, the workpiece and the gap to provide the voltage buildup across the latter, while the voltage across the gap is detected by a voltage divider or the like and the output of this voltage divider is supplied via an integrating circuit in a squaring or gating-type logic device, e.g., a Schmitt trigger capable of producing the digital output for triggering the semiconductive power switch of the machining-current power supply.

Kiyoshi Inoue
INVENTOR.

BY Karl F. Ross
Attorney

EDM POWER SUPPLY FOR GENERATING SELF-ADAPTIVE DISCHARGE PULSES

CROSS-REFERENCE TO RELATED APPLICATIONS

This application is a continuation-in-part of the commonly owned copending application Ser. No. 682,824 filed 14 Nov. 1967 and now U.S. Pat No. 3,539,755 as a continuation-in-part of my earlier application Ser. No. 493,473 of 6 Oct. 1965 and now U.S. Pat. No. 3,360,683.

GENERAL BACKGROUND

This invention relates to an EDM power supply for generating self-adaptive discharge pulses and, more particularly, to improvements in power supply arrangements for the electric discharge machining of conductive workpieces.

In electrical discharge machining, hereinafter referred to as EDM, conductive workpieces are machined by passing electroerosive power pulses between a workpiece and a tool electrode spacedly juxtaposed therewith across an electrode gap flooded with a dielectric coolant which also serves to carry away the detritus of the electric discharge machining process.

In the EDM surfacing or cavity sinking of a conductive workpiece, a discrete electrical power pulse of a duration of $10^{-7}$ to $10^{-2}$ second may be applied across a relatively carefully dimensioned machining gap with a spacing, for example, of 0.05–0.005mm., to cause a spark discharge or a discharge of the short arc type to momentarily jump across the smallest dielectric path between a tool electrode and the workpiece, constituted as a counterelectrode. The applied electrical energy is highly concentrated (generally exceeding $10^5$ watts/cm.$^2$ with a current density of $10^4$ to $10^9$ amp/cm.$^2$) and is localized within the discharge column, thereby removing particles of that portion of the workpiece surface upon which the discharge impinges. As a consequence, a crater is formed in the workpiece surface opposite the electrode. The next time-spaced pulse may then seek another point of the work surface and bridge across the electrode and workpiece a further high-energy electroerosive discharge. A train of power pulses is thus formed to create localized material removal discharges which produce cumulatively overlapping craters in the workpiece surface; the total surface is thus machined uniformly over the parts thereof confronting the electrode and the machine portion receives a configuration conforming to the shape of the electrode.

The latter may be formed with the desired configuration of the cavity or the shape complementarily desired in the workpiece. During the machining operation, small metal or conductive chips or particles are carried away from the gap by the liquid dielectric which floods the gap and is generally circulated therethrough, while the tool electrode is advanced relative to the workpiece by a servo mechanism designed to maintain a predetermined gap spacing or designed to approach the desired gap spacing as accurately as possible.

In high-speed electric discharge machining operations, the energy of each individual discharge pulse is generally augmented for a given gap spacing to increase the amount of material removed per pulse; in addition or alternatively, the pulse repetition rate may be increased by reducing the discharge rest time or interval between one discharge pulse and the next to the minimum consistent with successive pulse formation and a stable cutting condition. In "no wear" operations, in which the tool electrode erosion is limited or eliminated, copper or graphite electrodes are customarily employed and are commonly poled positive while the workpiece electrode is poled negative, in contrast to normal machining operations in which the opposite polarity relationship in maintained. In such "no wear" operation, pulse duration must be relatively long, generally upwards of about 10 microseconds and the pulse amplitude or peak current must be controlled as not to exceed, say, 300 amperes. Excessively long pulses are avoided since they tend to produce discharges which transform an impulsive short period arc into a damaging thermal arc. Where increased fineness of the surface finish is required, a pulse train using narrower pulses is utilized. This latter type of pulse train results in a substantially reduced rate of removal of the workpiece material and also results in greater erosion of the tool electrode.

PRIOR ART

In commercially available electrical discharge machining apparatus, therefore, the pulse generator must be capable of permitting a wide range of selection of pulse parameters in accordance with the requirements of the particular machining operation. In the past, much effort has gone into the designing of a versatile and yet efficient periodic pulse generator. It may be noted in the following discussion of the prior art that in substantially every case a pulse generator of predetermined frequency is required. For example, in order to overcome the apparent restriction of relaxation-type pulse generators with respect to the flexibility of pulse frequency, pulse duration and pulse interval, a transistorized switching of a DC source with a free-running multivibrator has been proposed. The multivibrator is settable to produce a train of exactly identical signal pulses for a bank of switching transistors and ultimately opens and closes the switching transistors for a fixed duration and with a fixed interval to connect the DC machining source at a fixed frequency with the gap independently of the conditions prevailing at the latter during the machining operation.

It has already been recognized that this type of pulse generator cannot reliably carry out electrical discharge machining because of the fact that the machining gap, as a practical matter, varies with respect to most of its parameters, i.e., spacing of the electrodes, degree of contamination by particles eroded from the workpiece and ionization products of the dielectric, residual ionization, etc. As a consequence, the application of a train of machining pulses of constant amplitude, pulse duration, and interpulse interval results in short circuiting, damaging thermal arcs or discharge failure depending upon the condition of the gap. To avoid some of these disadvantages, it has been proposed to provide a so-called "isopulse" system permitting current pulses of an exactly equal duration to appear across the machining gap at an undefined frequency with the aid of a pair of monostable multivibrators, one of which is used for fixing the duration of the machining current pulses while the other establishes the interval between the successive voltage pulses. Another approach, along similar lines, employs a train of high-voltage pulses or otherwise imposes high power arc-striking voltages at a leading edge of independently generated main voltage pulses, thereby forcing the occurrence of each discharge. In all of these systems, the possibility of short-circuiting or thermal arcing remains unsolved or incompletely solved. Indeed, further attempts have been made to avoid these difficulties by the cutoff of each pulse in dependence upon the gap conditions, but here too it is difficult to ascertain precisely when a pulse has become transformed into an abnormal pulse and should be cut off.

The problems of how to avoid detrimental short circuiting, thermal arcs and open circuiting (nonfiring) of the gap without decreasing the efficiency of a EDM operation has indeed plagued the art and much concern has been expressed about these problems and various solutions proposed. Thus it has, in general terms, been suggested to determine gap conditions with the aid of a pilot pulse or to otherwise ascertain whether the gap is in a normal or abnormal state and control the machining pulse accordingly. In one such system, a DC pilot voltage produces a voltage surge to fire the machining gap, the magnitude of the voltage surge being measured by a suitable network to determine whether the gap is normal or abnormal and, when the former is the case, to trigger a pulse generator to generate the machining pulse of fixed duration. Another arrangement senses the gap deionization after a preceding machining pulse, and in response thereto, operates the pulse generator to produce a voltage pulse of preset duration. In all cases, an oscillator-type trigger arrangement is provided to produce pulses of at least one fixed parameter, i.e., pulse frequency, pulse duration, etc.

It has already been noted that two machining pulses of an identical duration generally are incapable of providing the identical degree of electrical discharge machining or are incapable of ensuring equal energy with respect to the material removed since the working gaps are seldom completely identical upon firing. In selecting the machining parameters, the pulse duration is generally determined to attain a desired surface finish or the machining rate deviations from this optimum result in variations in surface finish or reduce machining rates. An important consideration in EDM systems is that one discharge must be prevented from following the same path or striking the same point that was subjected to the previous discharge; in such cases, a continuous arc may result which causes overheating (thermal damage), cracking of the workpiece and a reduced cutting rate since little erosion takes place during thermal arcing. It is therefore important to insure satisfactory deionization of the machining gap between successive discharges, but to prevent excessive delay between discharges.

APPLICATION SER. NO. 682,824

In my copending application Ser. No. 682,824, mentioned earlier, and of which the present case is a continuation-in-part, I have pointed out that a pulse generator system for EDM operations must include circuitry for adjusting the parameters of the pulses. In that system, varying gap conditions are detected to adaptively control machining pulses without respect to the duration, interval and/or repetition rate or mean discharge current within a fixed range whereby problems of short circuiting, open-gap pulses and thermal arc are minimized. In the system of that application there is provided a periodically operated electronic switch with a preset on-off time having its principle electrodes connected in series with a direct current machining power supply and the discharge gap for providing machining pulses to the latter. Sensing means is connected to the gap for providing an electrical output signal responsive to abnormal gap condition while control means is operatively connected to the control electrode of the switch for decreasing its on-time and machining pulse on-time responsive to this signal. Delay means is coupled between the sensing means and the control means for delaying the operation of the latter a predetermined time interval after occurrence of the abnormal condition. In more specific terms, the electronic switch has a pair of principal electrodes connected between the power supply and the gap and the pulse generator includes a multivibrator having its output connected to the control electrode of the switch. The multivibrator, inturn, is provided with a pair of electronic switches biased or coupled for alternate operation and at least one resistance-capacitance network connected to the control electrode of one of the pair of electronic switches (e.g., transistors) for controlling the timing of the alternate operation. In this case, the sensing means may include a variable inductance for providing an output signal which is a function of the relatively high frequency discharges occurring across the gap during normal cutting, while the delay network includes the series connected adjustable inductor and a plurality of capacitors coupled in a delay-line configuration with the inductor.

OBJECTS OF THE INVENTION

It is the principal object of the present invention to provide a self-adaptive EDM power supply and a machining method which will obviate the aforementioned disadvantages and provide improved cutting rates and finishes, reduce or eliminate the tendency toward short circuiting and nonfiring, and also preclude the formation of thermal arcing.

Another object of this invention is to provide an improved electrical discharge machining power supply and method which will extend the principles set forth in application Ser. No. 682,824, but which will be substantially nonlimiting with respect to its dependence upon periodic pulse sources.

Still another object of this invention is the provision of an electrical discharge machining power supply, apparatus and method for optimizing the discharge machining of metallic workpieces substantially independently of the changing gap conditions generally encountered in such systems.

SUMMARY OF THE INVENTION

It has now been found that it is possible to optimize or provide self control for electrically erosive discharge pulses, i.e., pulse "frequency" and the other essential pulse parameters. More specifically, the present invention provides a closed-loop self-adaptive pulse generator for optimal timing control (on/off) of an electronic switching element or power switch that operatively connects a DC machining-power source with the machining gap, to provide self-adaptive material-removal spark-producing pulses. The term "closed-loop generator" is used herein to refer to a system in which the machining gap itself is part of the signal-pulse generator or the power switch, i.e., the machining gap is connected in a series circuit with the remainder of the signal-pulse generator, so that the gap itself controls the power circuit and the turning on and turning off of the power switch in response to the gap state, thereby permitting the power to be delivered to the gap in a precisely regulated discharge and the termination of the discharge by turning off the switch also in response to the gap state. It is thus essential to the present invention that the gap parameters control both the turning on and turning off of the switch as will become apparent hereinafter. The duration is determined by the sensed parameter, also in relation to the gap state when the discharge is initiated and/or while the discharge is being passed by the gap. Thus, only when the input of the system is connected to the gap, is a train of pulses generated which are considered to be "aperiodic" in the sense that they are formed at undefined repetition rate, or of undefined "off-time" and of undefined "on-time," the discharge time being held preferably within a preset range. The power switch is desirably of the solid-state type described in the aforementioned copending application and can carry a high DC power while insuring rapid and reliable switching operations under heavy load; the "on" and "off" characteristics of such switches can thus be generally referred to as "instantaneous."

In the apparatus aspect of the invention, a sensor provides the machining gap information manifesting the gap state and this information is registered in the form of an analog (to the gap variable) by a suitable wave shaper, for example, an integrating network. The level of the analog signal changes with time, and represents the gap parameters and variables at a given time and the rate of change closely reflecting the total gap state as well as the gap state prior to the discharge in question. According to a specific feature of this invention, the analog signal is fed to a threshold gating circuit wherein it is compared with a threshold reference to produce either of two possible digital states with sharp interstate transition depending on the analog signal and thereby functions to perform a "squaring" of the analog information in the from of A/D conversion (analog-digital conversion). Thus, in one state of the circuit in response to the analog signal, no output appears (corresponding to the digital "zero" signal state), while the circuit in another state produces a square-wave output corresponding to the digital "one" state. This pair of signals functions as a trigger to close the power switch and open the latter, thereby causing the switch to be alternately conductive and nonconductive, preferably via an intermediary amplifying stage.

In accordance with the method aspects of the present invention, an electrical discharge machining electrode is spacedly juxtaposed to the conductive workpiece across discharge gap while a dielectric liquid coolant is passed through the gap. The electrode and the workpiece are relatively displaced during the machining of the latter to maintain the gap spacing generally constant, e.g., via a servomechanism responsive to the potential or other electrical parameter detected across the gap. Across the electrode and the workpiece, I apply a direct current arc-striking voltage sufficient to initiate discharge across the gap, while permitting the voltage to build up thereacross to a level constituting a function of conductivity characteristic of the gap and also permitting the voltage to decay with discharge across the gap. From that voltage buildup and decay, I am able to derive an analog signal representing the voltage buildup and decay and to use this analog signal to trigger the machining-current flow across the electrode and the workpiece upon the analog signal exceeding a first threshold value and upon initiation of discharge by this arc-striking voltage. Using the same gap-dependent signal, the machining-current flow through the gap is terminated upon the value of the signal, representing the gap voltage attaining a second threshold value, the threshold values being adjustable in accordance with the desired machining state.

Thus, a first digital condition may be established upon the analog signal exceeding the first threshold value whereas the logically converse second digital condition is formed upon the analog signal attaining the second threshold value, while the machining-current source is advantageously switched at the occurrence of these digital conditions on and off instantaneously.

The arc-striking voltage is applied across the electrode and the workpiece via a limited current DC source connected across the gap in the closed-loop or series circuit mentioned earlier, the analog signal being derived at least in par while detecting the gap voltage and producing a signal proportional thereto. Preferably the sensed signal is integrated to form the analog signal.

Also in accordance with the method aspects of the invention, it may be pointed out that the present system derives an analog signal from the gap indicative of gap recovery from a preceding discharge and related to gap conductivity. From the analog signal, there is produced at least one digital triggering signal deriving an analog signal from the gap indicative of gap recovery from a preceding discharge and related to gap conductivity; the analog signal is used to generate at least one digital triggering signal, preferably two such digital triggering signals, upon the analog signal attaining predetermined threshold values. Aperiodically the source of machining current is turned an and off instantaneously with the triggering signal.

ADVANTAGES OF THE INVENTION

It has been found that the aforedescribed improved system has significant advantages over earlier systems, whether of the nonadaptive type or of the type having some degree of self-adaptivity. For example, with the present invention it is possible to obtain improved surface finishes at a given removal rate or increased removal rates for a given surface finish; continuous arcing is excluded for all intents and purposes and hence high quality machine surfaces without burning damage can be obtained. Moreover, the corners and edges of the workpieces are sharply defined, the regions of the workpieces below the machined surface of the workpiece are less affected by heat than in previous systems, and an extended range of operations is possible in "no wear" modes of operation. Stable cutting conditions are maintained throughout the operation and the system is adaptable to full automatic control without operator supervision or intervention.

BRIEF DESCRIPTION OF THE FIGURES

The above and other objects, features and advantages of the present invention will become more readily apparent from the following description, reference being made to the accompanying drawing in which.

SPECIFIC DESCRIPTION I, GENERAL

Figure 1:
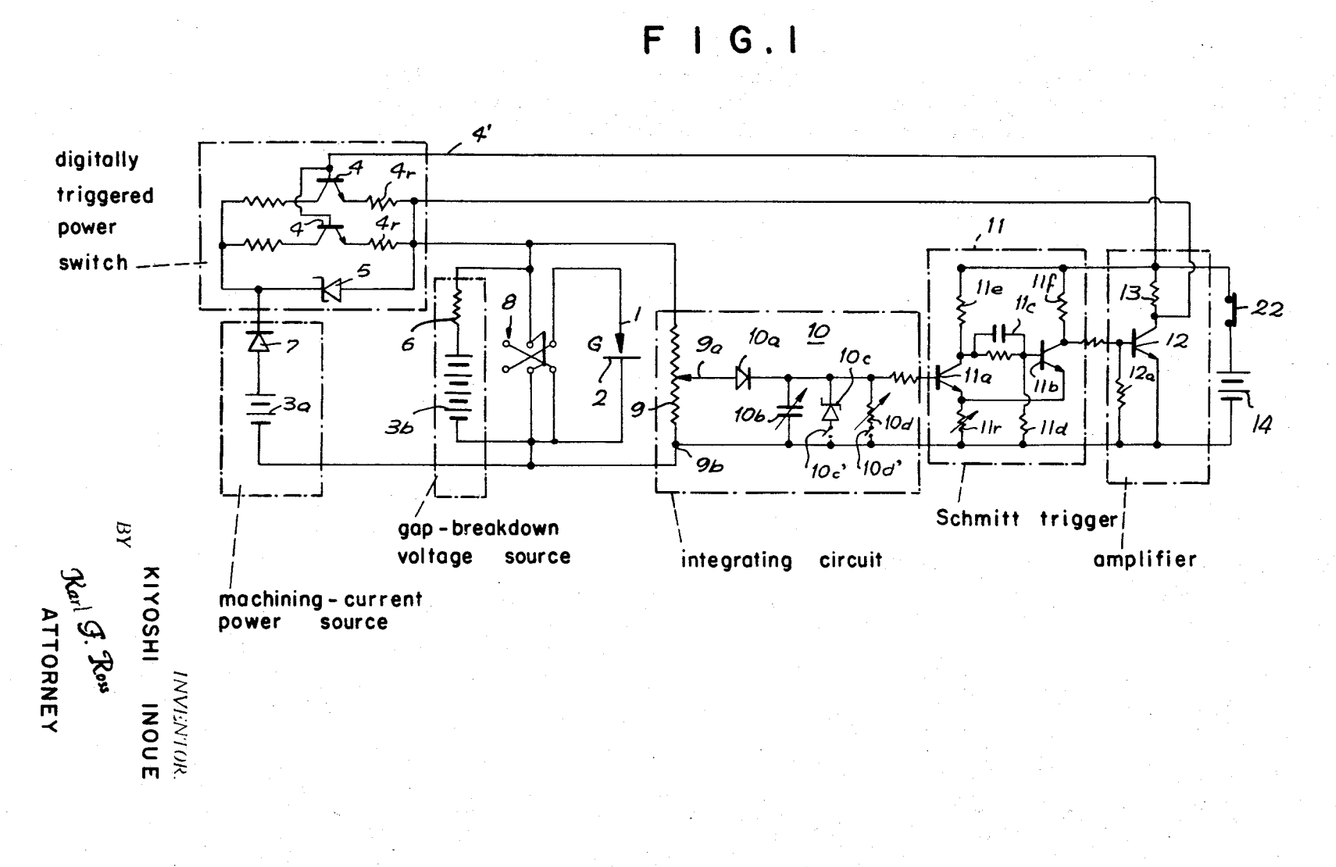
FIG. 1 is a circuit diagram of an apparatus embodying the present invention.
Figure 1A:
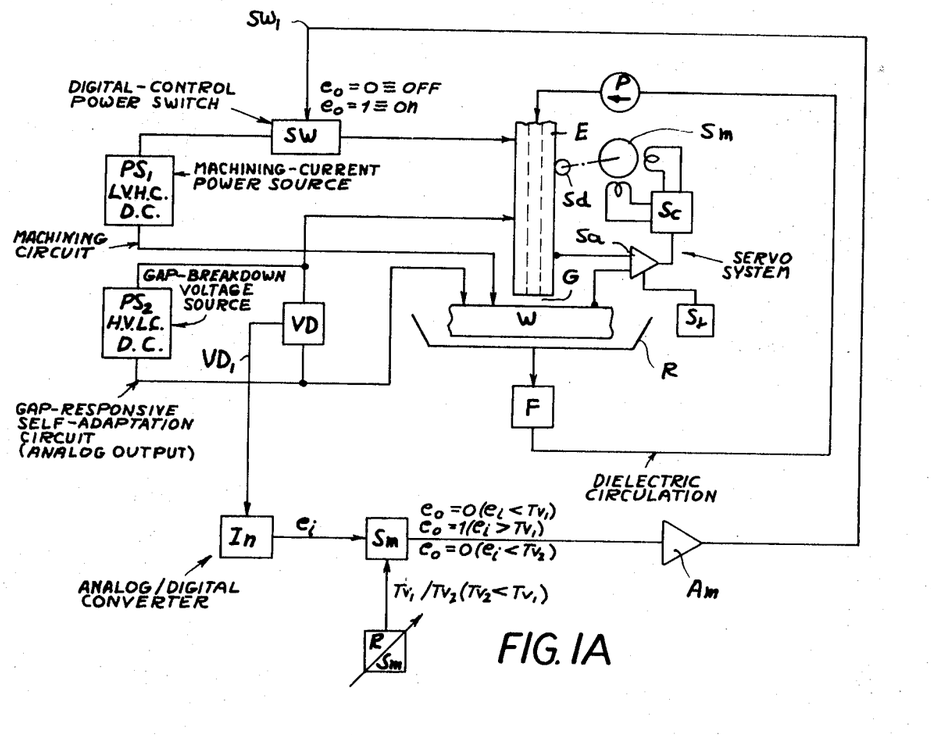
FIG. 1A is a block-type diagram of an EDM machining system illustrating principles of the present invention.

Referring first to FIG. 1A of the drawing, it may be pointed out that a basic EDM system for the machining of a workpiece W comprises a tool electrode E formed by the central bore or other aperture arrangement through which a liquid dielectric coolant is circulated, e.g., by a pump p. The receptacle R may be used to recover the detritus-entraining coolant which is passed through a filter F adapted to remove from the coolant particles of metal dislodged by discharge in the apparatus.

The tool electrode E may, in turn, be displaced toward the workpiece W for the relative displacement of electrode and workpiece to maintain approximately the preferred width of the machining gap G.

Also in FIG. 1A, there is shown a system, the circuit for which may be that illustrated in FIG. 1 and which is designed to show general principles of the invention without obscuring these principles with details of circuitry, etc.

Basically, apart from the electrode E, the workpiece W, the dielectric-liquid circulation system F, P, R and the servomotor $Sm$, which is connected with the electrode by a servo drive $Sd$, there is provided a gap-responsive circuit, represented by the servo amplifier $Sa$, connected between the electrode E and the workpiece W across the machining gap G. A reference input, represented at $Sr$, applies a signal representing the desired gap level to the amplifier $Sa$ which acts in the manner of normal servosystems (see my above-mentioned copending application and the earlier applications and patents set forth therein) to produce an error signal or the like controlling the servomotor $Sm$ via a servocontrol circuit $Sc$. Hence, during the course of the machining operation, the gap G is approximately maintained by appropriate feed of the electrode E and the workpiece W via the feedback servosystem shown in FIG. 1A.

In accordance with the principles of my invention, the machining-current power source is in part formed by a high-current, relatively low-voltage DC source $PS_1$, connected in the machining circuit in series with a power switch SW across the electrode E and the workpiece W, the latter forming a counterelectrode. The switch SW is electronically controlled and preferably is a bank of power transistors, e.g., as described in application Ser. No. 682,824 or the prior, then pending application Ser. No. 493,473, now U.S. Pat. No. 3,360,683.

This switch has a control electrode $SW_1$ which is digitally triggered by an one of two digital states into the "on" condition while the second digital condition, constituting the logical reversal or opposite of the first, triggers the power switch into its "off" state.

In the system illustrated in FIG. 1 an application of the control signal $e_o=0$, as illustrated, represents the "off" digital condition while the application of the control signal $e_0=1$ represents the "on" state of the power switch. This electronically controlled switch SW is capable of short or "instantaneous" cutoff and turn-on operation to apply the machining current across the electrode E and the workpiece W.

Apart from the machining-current source $PS_1$, which is of relatively low voltage and relatively high current, I provide a second direct current source $PS_2$ in a gap-responsive self-adaptation circuit which eventually provides the analog output necessary to generate the digital signal which operates the power switch SW via a phase (polarity) reversal amplifier $Am$. The source $PS_2$ is a relatively high voltage, low-current source, e.g., a source in series with a current-limiting impedance 6 as illustrated in FIG. 1, which is connected in a closed-loop or series circuit with the gap G across the electrode E and the workpiece W to effect a voltage buildup thereacross. As has already been noted, the system of the present invention omits any pulse-generating system having a characteristic pulse frequency of any type.

However, to determine gap condition, a sensing device VD is connected across the gap G between the workpiece W and the electrode E to provide an output signal at its terminal $VD_1$ which is basically representative of gap condition. This analog value, preferably voltage, is delivered to an A-D (analog/digital) converter, including, for example, an integrator $I_n$ making use of a capacitor across which the sensing signal of the voltage detector VD is applied. The analog output $e_i$ of integrator $I_n$ is applied to a threshold discriminator, e.g., unstable device such as a Schmitt trigger $Sm$ designed to switch over when the analog input attains predetermined threshold values represented as $Tv_1$, and $Tv_2$ to produce the digital outputs $E_0=0$ when $e_i<Tv_1$, the output $e_0=1$, when $e_i>Tv_1$ and $e_0=0$ when $e_i<Tv_2$, where $Tv_2<Tv_1$.

II. FIRST EMBODIMENT (GENERAL)

The apparatus shown in FIG. 1A, the operation of which will be discussed in detail in connection with Fig. 1, represents a basic system which may be modified in various respects as described in detail below and even illustrated in some of the latter figures, for example, a common power source may be provided in which the gap-responsive adaptation circuit is provided with impedances limiting the current flow while the machining circuit is tapped across the power source to limit the voltage level of the machining-current source. Such modifications are described in detail hereinafter.

However, the basic system is clear from FIG. 1A which demonstrates the total adaptation of the machining current in the absence of a periodic trigger.

The power source $PS_2$ serves as an arc-striking voltage source which builds up the potential across the gap and eventually fires the latter to operate the switch SW shortly before or at breakdown of the gap. The sharp-waveform machining-current pulse thus is triggered across the gap G only upon the breakdown initiated by voltage buildup. However, the duration of the discharge is determined by the decay of the analog voltage to a predetermined threshold established by the threshold of the Schmitt trigger or some other bistable device as represented, for example, by the reference input $R_{sm}$; it thus is possible to produce an aperiodic triggering of pulses whose initiation, duration and interval all vary from one pulse to the other in accordance with the actually detected gap conditions and represented by the analog signal.

In FIG. 1, I show a self-adaptive power supply circuit for an electric discharge machining apparatus provided with a servomechanism for displacing the electrode relatively to the workpiece and a coolant circulating system as described in connection with FIG. 1A.

In this system, the electrode 1 is spacedly juxtaposed with the workpiece 2, constituted as a counterelectrode, across the machining gap G flooded with the dielectric coolant (e.g., kerosene). The machining current power source comprises the main DC source $3a$ which is connected across the gap G via a digitally triggered power switch constituted by a bank of NPN power transistors 4 in series with emitter resistors $4r$. A zener diode 5 is connected across the power terminals of the transistor 4 to ensure a constant voltage output for the power transistors 4 which have their parallel-connected emitter-collector paths in circuit with the electrode 1, the workpiece 2, the gap G and the machining power source $3a$. A surge-blocking rectifier diode 7 is connected in series with source $3a$ to prevent reverse-current surges or voltages from damaging the power source. The bases or transistors 4 are energized in common by a line $4'$ to which digital conditions are applied by a closed-loop, self-adaptive, self-timing system described in detail hereinafter. The main DC source $3a$ has a low internal impedance and high current capacity so as to be capable, for example, of delivering not less than 50 amperes, the switching transistors 4 being used in such number as to permit the desired peak current to pass through the gap during machining.

A gap breakdown or "striking" voltage source $3b$, constituting an auxiliary DC source with high-voltage and low-current characteristics (e.g., with an output voltage having a no-load value capable of attaining 100 to 500 volts) is connected in parallel with the main source $3a$ across the electrode 1 and the workpiece 2. In this auxiliary circuit, there is provided a high ohmic resistor 6 as a current-limiting impedance to restrict the short-circuiting current from the high voltage source $3b$ to a particular maximum level, (e.g., 0.1 to about 1 ampere). It is impossible, therefore, for this auxiliary source alone to sustain a machining discharge. According to the invention and the principles set forth above, the auxiliary source serves to ignite, initiate or strike spark discharge across the gap, alone or in conjunction with a voltage contribution by the main power source and to explore the gap condition to obtain the timing of the turn-on of power transistors 4 as will be apparent hereinafter.

Moreover, since breakdown can be initiated across the gap by this high voltage, low-current auxiliary source, it is possible and desirable to reduce the power rating of the main DC source $3a$ to a significant extent, e.g., such that the main power source has an output voltage between 10 and 50 volts and just sufficient to maintain an arc-type discharge, once the same has been initiated by the main source, but incapable of initiating such a discharge alone. The auxiliary power supply $3b$, 6 is thus designed to initiate or "strike" a discharge across a deionized gap, while the sustenance of this discharge and the actual machining operation is provided by the main power source $3b$. The overall power unit can thus be relatively compact, using sources of lower power rating and distributing the power consumption more economically over the parts of each discharge and upon the power supplies used therefor.

A polarity selector or reversing switch 8 is provided to render the electrode 6 positive or negative, selectively, with respect to the workpiece and thus permit the apparatus to operate with reverse polarity or normal polarity as desired for particular machining requirements.

The self-timing adaptation system includes a sensing resistor 9 connected across the gap G for drawing information in the form of a gap-voltage signal, characterizing the changing conditions at the gap. The output signal is an analog related to the conductivity condition of the gap, across which voltage builds up upon full recovery of the gap after a preceding discharge. The adjustable tap or wiper $9a$ of the resistor 9 and a fixed terminal $9b$ develop the integratable signal thereacross and are connected to the integrator network 10 across a capacitor $10b$ in series with a diode $10a$, the capacitor $10b$ being adjustable for calibration, etc. The capacitor $10b$ charges and discharges in response to the gap condition variations represented by the voltage output tapped across terminals $9a$ and $9b$ of resistor 9 to produce the analog output as a function of time with a wave representation, e.g., as shown at Vc in FIG. 2.

The circuit 10 may also include a zener diode $10c$ bridged across the capacitor $10b$ in a clipping orientation to clip the analog voltage built up in the capacitor beyond a predetermined level characteristic, of course, of the rating of the zener diode 10c. Switch 10c' may be closed to tie the zener diode across the output of the integrating circuit. The integrating circuit may also include a variable resistor 10d connected across the capacitor in a time-constant (R–C) network adjustable to establish a discharge-time constant for the integrating capacitor 10b.

Connected to the output of the integrator 10, as described generally in conjunction with FIG. 1A, there is an analog/digital converter in the form of a threshold gating circuit 11, constituted as a Schmitt trigger, energized by the DC source 14 which may be open-circuited via switch 22 to render the trigger circuit 11 inoperative. The Schmitt trigger 11 establishes the digital conditions which are applied to the power switching transistors 4 via the line 4', thereby providing the timing signal of varying width in dependence upon the incoming analog signal which is discriminated with respect to two threshold or reference values. The circuit 11 comprises a pair of NPN transistors in conjugated relationship wherein an R–C network 11c connects the collector of the input transistor 11a with the base of the output transistor 11b. The input signal is applied from the output side of the integrating circuit 10 across the base and an emitter resistor 11r of the input transistor 11a, the resistor being adjustable to set a pair of threshold values. The resistors 11d, 11e and 11f are respectively the base-bias resistor of output transistor 10b, collector-bias resistor of input transistor 11a and collector-bias resistor of the transistor 11b. Connected to the output of the Schmitt trigger 11, there is an amplifying transistor 12 of the NPN type which also performs a phase reversal with the phase-reversed output appearing across the output resistor 13. The base-bias resistor of the amplifying resistor 12 is shown at 12a.

The Schmitt trigger 11 may be of the type described at pages 389 ff of Pulse, Digital and Switching Waveforms, Millman and TAUB, McGraw-Hill Book Co., 1965, and is a bistable circuit having two possible output states depending upon the level of the input signal applied at the base of transistor 11a. The variable resistor 11r when set, establishes a pair of threshold values as generally described in connection with FIG. 1A so that the circuit acts as a discriminator which converts the level of the analog signal of the integrating circuit 10 to a digital output represented by the two states of the Schmitt trigger.

When the terminal voltage of capacitor 10b is below a first threshold value, transistor 11a is nonconducting or blocked while transistor 11b is conducting and the amplifying transistor 12 cut off so that no output signal appears across the output resistor 13. When, however, the terminal voltage of the capacitor 10b rises above this first threshold level, transistor 11a is biased into its conductive state, transistor 11b is cut off and amplifying transistor 12 is switched into its conducting condition so that a voltage drop appears across the output resistor 13 and serves to trigger the power switch 4. If, thereafter, the input at the base of transistor 11a falls below a second threshold value, slightly less than the first threshold value, transistor 11b is rendered conducting and amplifying transistor 12 is blocked so that the signal previously produced, and appearing as a voltage drop across resistor 13, is terminated. The positive side of resistor 13 is connected to the bases (in parallel) of the power transistor 4 which are of the NPN type as previously noted, while the negative side of resistor 13 is connected via the resistors 4r to the emitter electrodes of these transistors. Thus only when an output signal appears across the resistor 13, are the power transistors rendered conducting and held in their conducting state to connect the main DC source 3a with the machining gap G.

III. FIRST EMBODIMENT (OPERATION)

Figure 2:
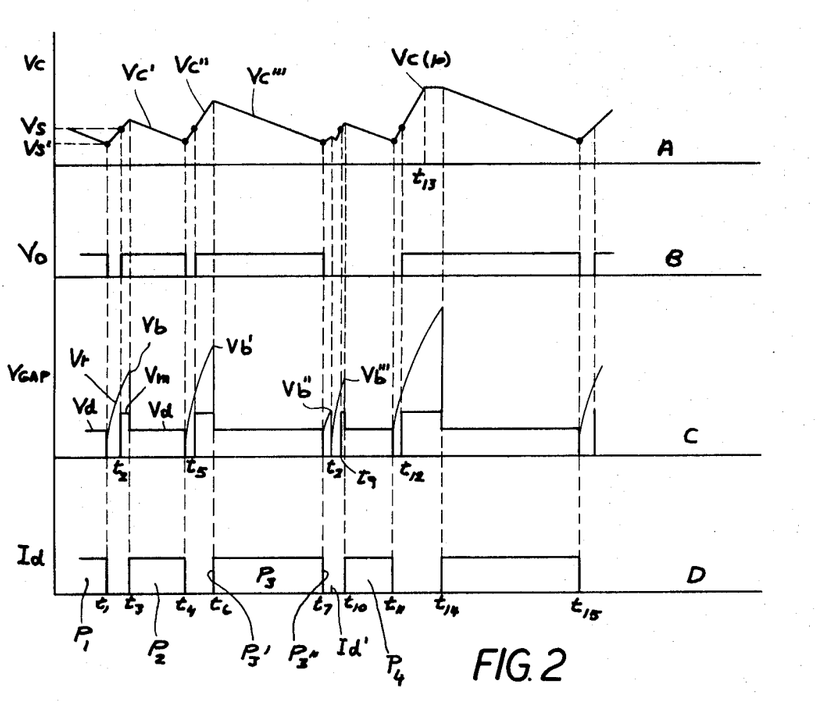
FIG. 2 represents waveforms obtaining in the circuit of FIG. 1 at various parts thereof.

In FIG. 2, I show the waveforms encountered in the system of FIG. 1 and wherein amplitude is plotted along the ordinate against time as the abscissa; the wave form A represents the terminal voltage $V_c$ across the capacitor 10b, waveform B represents the signal voltage $V_o$ appearing across the output resistor 13, waveform C represents the gap voltage $V_{gap}$, and waveform D represents the current pulses Id delivered to the gap.

Now consider an instant $t_1$ at which power transistors 4 are rendered nonconductive, sharply terminating a square-shaped discharge pulse $P_1$ with a current of Id and a discharge voltage at a level of Vd. As the gap becomes clear and deionized, voltage Vr (recovery voltage) will build up as a result of the auxiliary source 3b of high voltage which is connected across the no-load gap through resistor 6 and as a result of the free capacitance in the circuit.

The sensing resistor 9 continuously monitors the gap voltage and builds up in capacitor 10b a voltage rise represented by the terminal voltage Vc in analog form (waveform A of FIG. 2). As the capacitor voltage builds up correspondingly to the gap voltage Vr and exceeds a threshold level Vs of the Schmitt trigger circuit 11, which level is preset to correspond to full gap deionization, a transition occurs in the Schmitt trigger circuit 11 whereby transistor 11a is rendered conductive, transistor 11b is blocked and amplifier transistor 12 is rendered conductive, thereby producing a signal voltage $V_o$ at the output resistor 13. The latter signal voltage $V_o$, in turn, renders the bank of power transistors 4 conductive ($t_2$), so that relatively low voltage Vm from the main DC source 3a is applied across the gap G in parallel with the higher recovery voltage Vr.

Thereafter, the recovery voltage Vr and, in response thereto, capacitor voltage vc, continues to build up until the breakdown of the gap is effected by the recovery voltage at a magnitude Vb at a time $t_3$.

The time interval between $t_2$ and $t_3$ relates to the gap condition in this interval and the magnitude of the gap breakdown or arc-striking voltage vb; hence the peak level of capacitor voltage Vc is generally proportional to the gap spacing at $t_3$. Upon the firing of the gap by the arc-striking voltage Vb from the source 3b, discharge current is permitted to flow from the main source 3a through the power transistors 4 which have previously been rendered conductive at time $t_2$ and the resulting discharge is sustained at the relatively low voltage Vb to produce the machining pulse $P_2$.

As soon as the sudden drop of the gap voltage occurs, as consequence of the discharge through the gap, capacitor 10b responds to this change via sensing resistor 9, discharging the previously stored charge of resistors 10b so that its terminal voltage Vc drops linearly (or exponentially) at a rate determined by the capacitors of capacitor 10b and the resistance of the draining resistors 10d and 11r thereby forming the descending flank Vc' of the waveform as represented in the graph of the waveforms A in FIG. 2. When this linear or exponential decrease of the capacitor terminal voltage Vc reaches and becomes less than the second threshold value, represented at Vs', the reverse transition occurs in the Schmitt trigger circuit 11 at time $t_4$ such that transistor 11a is cut off, transistor 11b is rendered conductive and transistor 12 is switched into its blocking state, to sharply cut off the signal voltage $V_o$, thereby rendering power transistors 4 nonconductive substantially instantaneously. The time $t_4$ thus corresponds to the termination of the pulse $P_2$. One switching cycle "on/off" has thus been produced between the times $t_2$ and $t_4$ to produce a discharge pulse $P_2$ at a current level Id and a voltage Vd and with the duration $t_3-t_4$ adaptively controlled in dependence upon the gap condition.

Since the rate of discharge with time of capacitor 10b is a fixed parameter and the Schmitt-Trigger thresholds Vs and Vs' are also preset parameters, it will be apparent that, in accordance with this closed-loop self-timing system, the duration for which the analog voltage Vc is above the threshold level Vs' and, hence the duration of discharge pulse ($t_3-t_4$), varies as a function of the peak level of analog signal Vc and is a function of the gap breakdown voltage Vd characterizing the gap-conductivity condition at the time ($t_3$) the discharge pulse commences. The duration T of each discharge pulse can be expressed by the following formula:

$$T=t[1-Vs'/Vc(\max)]=Bt(1-Vs'/kVb)$$

where $t$ represents the discharge-time constant for capacitor 10b, vc(max) represents the peak level of analog signal Vc, Vb is the breakdown potential of the gap and $k$ is a constant.

At $t_4$, the gap-recovery voltage Vr again begins to build up provided there has been no failure of gap deionization. At $t_5$, at which the capacitor voltage Vc again passed the threshold Vs along the rising flank Vc'' of the analog signal, power transistors 4 are again rendered conductive by the sequence discussed above, thereby permitting the main voltage Vm to become effective across the open gap. At $t_6$, the voltage buildup across the gap fires the latter at a breakdown voltage Vb' higher than that of the preceding cycle (i.e., breakdown voltage Vb). The main voltage from the source 3a instantaneously drops to the discharge level Vd to produce the steep flank $P_3'$ of the next pulse $P_3$, the capacitor terminal voltage Vc then decreasing at the fixed rate ($t$) until it again reaches the threshold level Vs' at $t_7$ (along the descending flank V c'), at which time the power transistors 4 are rendered nonconductive, thereby terminating the discharge pulse $P_3$ along the steep flank $P_3''$. The pulse $P_3$ has a duration $t_6-t_7$ and is adaptively controlled in response to the gap voltage and spacing at the time when the gap was fired. The longer duration of the pulse $P_3$ may represent slight increase in the gap spacing or some other gap condition represented in a higher resistance of the gap.

Following this cycle, for example, if the gap G is not fully deionized or is in a condition inadequate to effect a power discharge, the gap voltage Vr will recover to a slight degree or will fire the gap at a relatively low level, e.g., that represented at Vb'', below the full deionization level. In such case, only a slight short-circuiting current from auxiliary source 3b (limited by resistor 6) may pass through the gap as represented by the current pulse Id' at time $t_8$. Thereafter, the recovery voltage Vr again builds up and finally exceeds the deionization level permitting power switches 4 to become conductive at $t_9$ while the capacitor terminal voltage Vc follows the recovery voltage Vr. At time $t_{10}$, a discharge pulse $P_4$ is initiated by the arc-striking voltage Vb'''. Since this striking voltage is relatively low, the discharge pulse $P_4$ is caused to terminate with a correspondingly narrow duration $t_{10}-t_{11}$.

The subsequent energization of the power switch arrangement 4 is effected at $t_{12}$ and is followed by the relatively wide open-gap interval $t_{12}-t_{14}$ as a consequence of an excessive gap spacing, represented for purposes of illustration. In the condition, the gap does not readily break down. Within this interval, the analog signal Vc is shown to reach its maximum level permitted by the breakdown level of the zener diode 10c which, if provided, limits an excessive voltage rise across capacitor 10b and thus is effective to avoid an unduly prolonged pulse which might cause thermal deterioration of the machined surface. The provision of a zener diode, together with an adjustable time constant for the capacitor 10b permits each individual power pulse to be automatically optimized within a predetermined fixed range to meet any particular machining requirements.

In the preadjustment of the aforedescribed circuit arrangement, a pulse amplitude and a standard pulse duration are determined in consideration of the intended degree of surface finish and also in accordance with whether or not tool wear is to be permitted. The pulse amplitude is then set by adjusting the number of switching transistors, e.g., by connecting the desired number in parallel in the power switch 4. The standard pulse duration is established for the most appropriate gap state which will prevail during the stable machining operation by suitably adjusting the time constant of the integrating network and/or the threshold levels Vs and Vs' of the SCHMITT-Trigger Circuit. In the machining operation, it can be assumed that one discharge pulse spans the shortest dielectric path whose spacing and condition are most appropriate to the finish and the machining rate desired. The discharge will then automatically be sustained for this fixed standard duration (e.g., the period $t_6-t_7$) and remove the desired amount of material while leaving a crater as expected for the intended result. The next discharge is automatically initiated after the lapse of the minimum deionization period under the existing gap state and when the requisite breakdown potential is attained. If the breakdown potential is relatively low as is represented at $t_3$ or $t_{10}$, this is an indication that the gap is relatively narrow, i.e., the discharge has been generated across a relatively narrow shortest dielectric path. The discharge duration is automatically determined by this indication, made by the analog voltage, and the discharge occasioned across this reduced gap is permitted to cease with optimum machining performance, i.e., without doing excessive work or expending excessive energy which might lead to gaseous discharge, the formation of thermal arc, etc.

IV FIRST EMBODIMENT (EXAMPLE)

A tungsten carbide workpiece of type G, having a performed hole of 8.6 mm., in diameter, was machined by EDM with a silver-tungsten alloy tool electrode of a diameter of 10 mm., to widen the hole. The liquid dielectric coolant with derosene circulated through the hole in the workpiece. To machine to a depth of 35 a conventional periodic pulse generator equipped with short circuit protection circuitry required 35 minutes to yield a machined product with a surface finish of 10 microns H (max), the initial removal rate of 0.75 g/min., declining as the machining proceeds due to the occurrence of continuous arc discharge at frequent intervals, to a removal rate as low as 0.1 g/min., at the final stage. The machining operation by these conventional techniques is represented in broken lines in FIG. 3.

Figure 3:
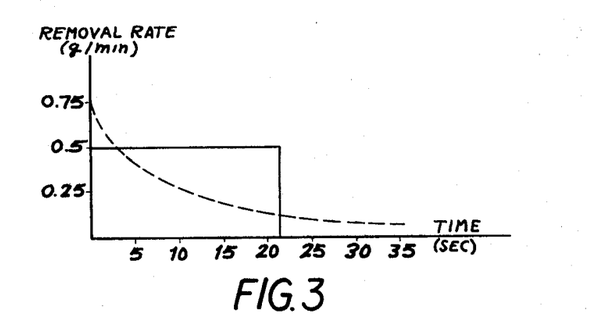
FIG. 3 is a graph illustrative of the present invention in which material removal rate is plotted along the ordinate against time along the abscissa.

With the system of FIG. 1, in accordance with the present invention, the total operation required 22.5 minutes and achieved better surface finish with a substantially constant removal rate of 0.5 g/min throughout the machining operation as represented in solid lines in the graph of FIG. 3. Moreover, the power supply of FIG. 1 has been found to be especially efficient in the sinking of deep holes, the formation of relatively deep dies and the machining of small areas in which trouble is most often encountered in conventional systems.

V. SECOND EMBODIMENT (General Description and Operation)

Figure 4:
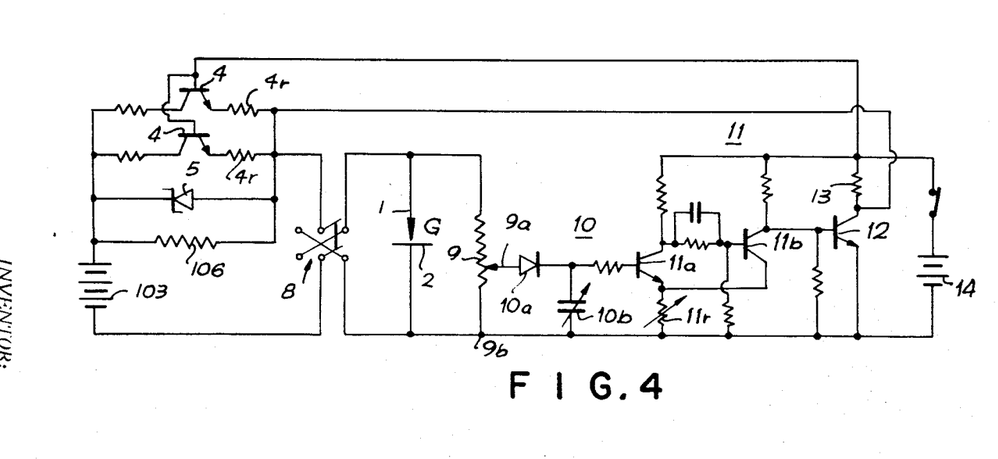
FIG. 4 is a diagram similar to FIG. 1 except provided with a modified voltage and current source arrangement.

In FIG. 4, there is shown a power supply circuit that is generally similar to that of FIG. 1 and operates in a corresponding manner except that in this arrangement a single direct current source 103 is provided and serves both as the source of machining current and as a source of the auxiliary voltage. In this embodiment, the rectifier 7 may be omitted and the high-ohmic current-limiting resistor 106 connected between the reversing switch 8 and one terminal of the DC source 103 which may deliver high voltage and high current. The current drain from this source in the auxiliary mode is restricted by resistor 106 while the voltage applied during the high-current discharge is regulated by the zener diode 5. Of course, the number of power-switching transistors 4 in series with the source 103 determines the machining current. Within the meaning of the terms used in the present disclosure, the auxiliary voltage source (high voltage, low current) is represented by the source 103 in series with the current-limiting resistor 106, while the low-voltage, high-current source is represented by the source 103 in series with the power transistors 4 bridged by the zener diode 5.

VI. THIRD EMBODIMENT (GENERAL)

Figure 5:
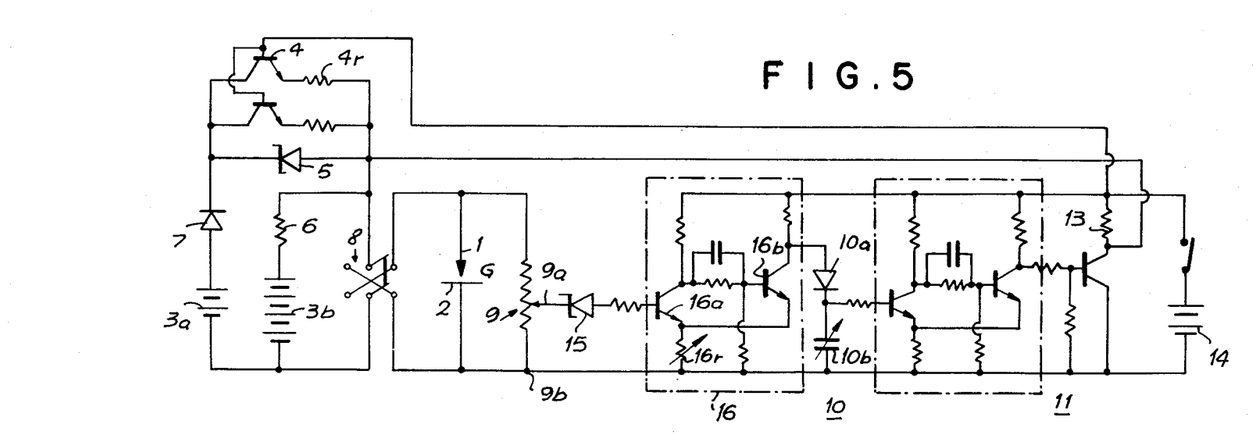
FIG. 5 is another power supply diagram for an EDM apparatus according to the present invention.

In FIG. 5, there is shown a modified circuit arrangement in which the machining current source 3a, 7, the power switch arrangement 4, the zener diode 5 and the auxiliary voltage source 3b, 6 are connected to an electrode arrangement 1, 2 across the gap G via a reversing switch 8 as described in connection with FIG. 1, while the sensing element is a variable resistor 9 bridged across the gap G and providing a voltage drop across the terminals 9a and 9b which is fed to the analog-signal network.

In this system, between the sensing resistor 9 and the integrating network 10, which is of the type described in connection with FIG. 1 and feeds the SCHMITT-Trigger 11, either or both of two threshold-level operating elements, such as the zener diode 15 and a SCHMITT-Trigger circuit 16, are provided to register upon the integrating network 10 only that portion of sensed gap voltage which is discriminated by one or both of these circuits components.

VII. THIRD EMBODIMENT (OPERATION)

Figure 6:
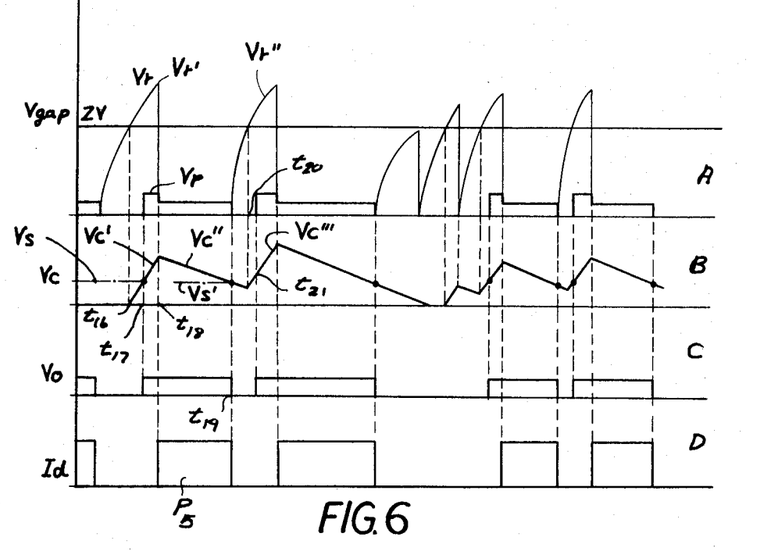
FIG. 6 is a series of graphs illustrating the waveforms obtaining in portions of the circuit of FIG. 5.

In FIG. 6 there are shown waveforms detected at the tapped resistor 9 (waveform A), across the integrating capacitor 10b of the circuit of FIG. 5 (waveform B), and at the output resistor 13 (waveform C), while the corresponding machining pulses, in terms of current, are represented as waveform D.

When the tapped voltage across the gap(Vr) exceeds a threshold level or breakdown voltage ZV of zener diode 15 (waveform A) as shown at $t_{16}$, the diode becomes conductive.

The cutoff voltage ZV of the zener diode 15 is set, as shown in FIG. 6, to be slightly higher than the upper threshold value of the Schmitt-trigger circuit 16. Thus, when the voltage Vr causes the diode 15 to become conductive, a first transistor 16a of the Schmitt-trigger is rendered conductive to cut off the second transistor 16b as generally described in connection with the Schmitt-trigger 11 with respect to which Schmitt trigger 16 is similar. The point at which the zener diode becomes conductive is represented at $t_{16}$ in FIG. 6. At this point, the integrating capacitor 10b which has previously been short circuited by the second transistor 16b, begins to charge along the rising flank Vc' as represented by the waveform B, with the voltage across the capacitor increasing at a predetermined rate (established by the charging constant) until the signal voltage sensed by resistor 9 suddenly drops below the zener level of the diode 15 in response to gap breakdown ta time $t_{18}$. Prior to this, the capacitor voltage Vc crosses the first threshold Vs of Schmitt trigger 11 to render transistors 4 conductive and produce the voltage peak Vp as a contribution by the machining current source 3a. The switching point is represented at time $t_{17}$.

Upon the breakdown of the gap at time $t_{18}$ by the voltage buildup to the point Vr' corresponding to the breakdown potential of the gap, the machining pulse $P_5$ is initiated. Also at this point, capacitor 10b (FIG. 5) begins to discharge, thereby producing the descending flank Vc'' of the analog pulse as described in connection with FIG. 2. When the capacitor potential falls below the second threshold Vs' of the Schmitt trigger circuit 11 ($t_{19}$), the machining current pulse 5 is sharply terminated. After termination of the pulse, recovery commences as represented by the next increase in the potential across the gap voltage Vr'' which at time $t_{20}$ attains the breakdown level of zener diode 15 to form the next rising flank Vc''' of the analog voltage across the capacitor 10b, thereby switching the power transistors 4 at $t_{21}$ and repeating the cycle. The response of the circuit to failure of gap deionization, to open-circuiting of the gap, etc., is similar in the system described in connection with FIG. 2.

VIII. FOURTH EMBODIMENT (GENERAL)

Figure 7:
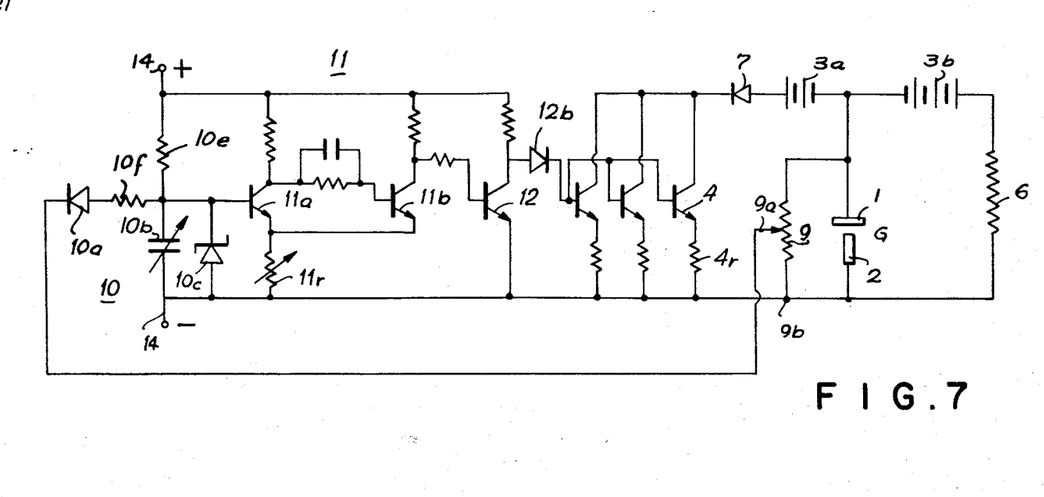
FIG. 7 is a circuit diagram of the preferred embodiment of the present invention.

In FIG. 7, there is shown another closed-loop self-adaptive pulse generator arrangement embodying the principles of the present invention and constituting the preferred system. Here again, the electrodes 1, 2 and the gap G are connected in a series circuit with the high-voltage source 3b and a current-limiting resistor 6 preventing excessive short circuit flow through this auxiliary pulse-generating network. The machining current is supplied by the lower-voltage source 3a in series with a reverse-surge-blocking diode 7. Between the machining-current source and the electrode arrangement 1, 2, there are provided the switching transistors 4 in a bank in which the number of transistors determines the applied current. Here, too, a variable resistor 9 spans the gap G to produce at its terminus 9a, 9b, the signal voltage representative of gap condition.

In this embodiment, however, means is provided whereby control of pulse duration can be effected within about 20 percent of the predetermined optimum discharge duration, i.e., ±10 percent. In this arrangement, the tap 9a or resistor 9 is connected to a rectifying diode 10a in series with a resistor 10f across the integrating capacitor 10b while a clipping zener diode 10c is provided across the capacitor 10b. Between the capacitor 10b and the positive terminal of the source 14 is provided a resistor 10e the output of the integrating circuit feeding the SCHMITT-trigger circuit 11, the digital output of which is applied via the amplifying and phase-reversal transistor 12 to the bases of the transistors 4 via a rectifier 12b.

As in the previous embodiments, therefore, the sensing resistor continuously monitors gap variation and registers across its tapped portion 9a, 9b a signal proportional to the changing gap voltage or resistors. The capacitor 10b is here designed to charge and discharge depending upon the sensed gap signal balanced with an oppositely poled fixed voltage reference source 14 and also operates the threshold-gating circuitry 11 and the amplifying transistor 12.

IX. FOURTH EMBODIMENT (OPERATION)

Figure 8:
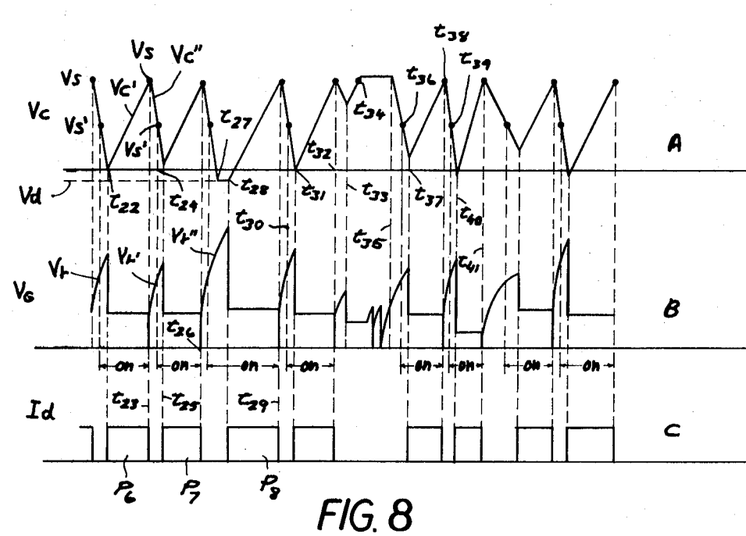
FIG. 8 is a series of graphs illustrating the waveforms obtaining in this latter circuit.

As can be seen from the FIG. 8, waveform A, in which the analog voltage Vc derived across the capacitor 10b is represented, upon breakdown of the gap accompanied by a sudden drop of the gap signal, capacitor voltage Vc begins to rise at a time $t_{22}$ along the steep flank Vc. In accordance with an important aspect of this system, Vc rises at a variable rate determined both by its charging time constant (i.e., the product of the resistance of resistor 10e and the capacitance of the capacitor 10b) and the sensed gap signal. The level of capacitor voltage in analog form is discriminated by the Schmitt trigger circuit 11 whose variable resistor 11r controls the thresholds of the circuit. Thus, while the capacitor voltage VC along the flank Vc' remains below the first threshold Vs of the Schmitt trigger, the bank 4 of power transistors is conductive to sustain the pulse $P_6$. However, when this threshold level is reached (time $t_{23}$), the gating circuit 11 inverts to terminate pulse $P_6$ by cutting off the power transistors 4.

Upon termination of the machining pulse $P_6$, a gap-recovery voltage Vr' builds up across the gap assuming, of course, full deionization of the latter, as drawn from the auxiliary voltage source 3b, the sensing resistor 9 responding to this buildup as represented by the descending flank Vc'' as shown for waveform A. At the point $t_{24}$, the descending flank Vc'' traverses the threshold level Vc' and the power transistors 4 are rendered conductive so that a further rise in the recovery voltage Vr' to its peak at t25 causes breakdown across the gap and the formation of the next discharge pulse $P_7$ with a time interval between the pulses as represented at $t_{23}-t_{25}$. The terminal voltage at capacitor 10b reaches its minimum at $t_{25}$. The machining cycle then proceeds with adaptively determined pulse duration, pulse spacing and pulse initiation until some defect occurs in the sequence.

Also in this system, the duration of each discharge pulse is found to vary adaptively in accordance with the state of the gap upon firing after the application of the voltage pulse, the state of the gap while the discharge is sustained, and the charging time constant of capacitor 10b. Thus it is possible to establish a standard pulse duration to meet the requirements of any particular machining operation by suitably regulating the capacitance of the integrating capacitor 10b for a given value of the charging resistor 10e or vice versa. Resistor 11r, which establishes the threshold level Vs and Vs', may also be set, these settings being designed to establish an optimum gap state and spacing which may prevail when the gap is fired and while the discharge is sustained. It has been found that, when each individual discharge pulse is controlled to vary within a range of ±5 to ±20 percent (preferably ±10 percent) of the standard duration in dependence upon the changing gap state, best results are obtained with respect to removal rate, surface finish, accuracy, quality of machined surface, stability of operation and minimal wear of the tool electrode (in a "no wear" mode).

If the gap discharge is initiated at a relatively wide spacing and, accordingly, with a higher recovery voltage $Vr$, this information (to the extent that it is within the permissible deviation indicated above) is reflected in the nature of the discharge. For example, pulse $P_8$ has a longer duration corresponding to the higher recovery voltage $Vr''$ necessary to break down the gap than is the case for the pulse $P_6$ or the pulse $P_7$.

However, if there is an excessive rise of recovery voltage across the gap owing to wider gap spacing, the capacitor terminal voltage $Vc$ is prevented from going excessively negative by the diode 10$b$ which clips the negative signal at a level $Vd$ (waveform A of FIG. 8). The clipping effect is shown between the time intervals $t_{27}$ and $t_{28}$. During the discharge, if the gap voltage is relatively high as shown for the interval $t_{26}$–$t_{28}$, capacitor terminal voltage $Vc$ rises relatively slowly to prolong the discharge pulse $P_8$. If the discharge voltage is relatively low, indicating sufficient gap deionization and a possible gas discharge, the pulse is correspondingly narrow, as will be apparent from the interval $t_{40}$⅛–$t_{41}$. At time $t_{33}$, a premature discharge is shown to take place before complete gap deionization is attained. In this case, only the limited current which may be drained at short circuit, can be drawn from the auxiliary source 3$b$. As long as the recovery voltage does not appear, the capacitor terminal voltage $Vc$ remains well above the Schmitt threshold $Vs'$, thereby holding the power transistors 4 nonconductive. It is also possible to avoid an excessive buildup of the capacitor terminal voltage within the interval $t_{34}$–$t_{35}$ by using the zener diode 10$c$ with a zener level slightly higher than the Schmitt trigger threshold $Vs$.

X. FIFTH EMBODIMENT

It has been found that, while the aforedescribed embodiments provide excellent machining performance in deep hole drilling by electric discharge machining and EDM deep-die sinking and wherever the removal of the particles of the workpiece is a problem, the removal rate remains comparatively slow by contrast with removal rates at the initial stages of conventional systems as can be seen from the graph of FIG. 3.

Figure 9:
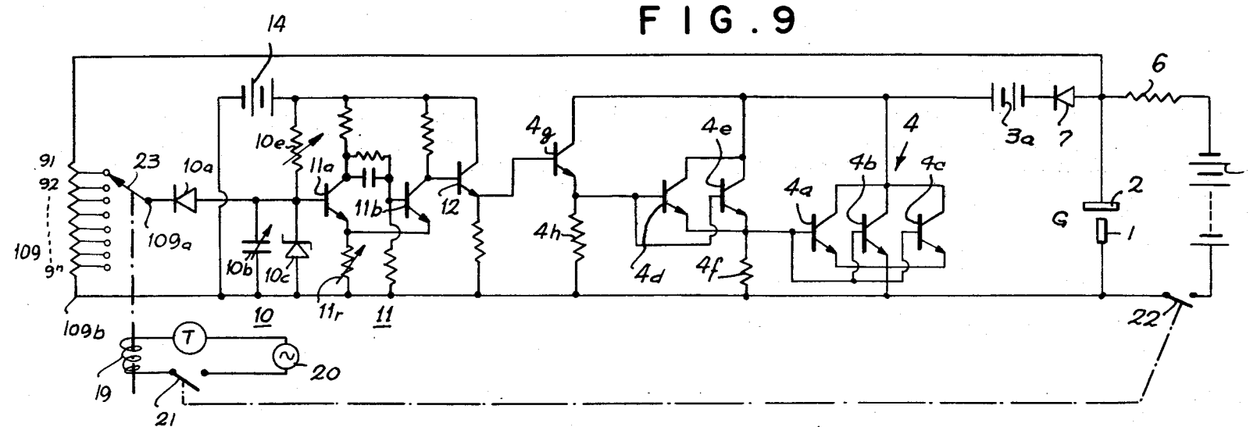
FIG. 9 is a circuit diagram of a power supply representing a modification of the system of FIG. 7.

It has been found to be possible to increase sharply the initial removal rate by comparison with conventional nonadaptive systems and yet maintain an improved removal rate throughout the machining operation by altering the rate of conversion of the gap signal, e.g., the gap-recovery voltage, into the integrated analog signal as machining proceeds. A system of this type is shown in FIG. 9. Here again the electrode 1 is juxtaposed with the workpiece 2 across the gap G and is flooded with a dielectric liquid coolant as described in connection with FIG. 1A. Here too, relative displacement of the electrode and the workpiece to maintain approximately constant gap width, is effected by a servomechanism of the type shown in FIG. 1A and described in connection therewith. Also, the main machining current is here supplied by a relatively low voltage machining current source 3$a$ in series with a reverse-surge suppressing rectifier diode 7 in series with source 3$a$, a power switch 4 and the gap G.

The power switch 4 here comprises a cascade arrangement of NPN transistors in an amplifying circuit of the type illustrated and described in the aforementioned application or U.S. letters patent and including a bank of main power transistors 4$a$, 4$b$ and 4$c$ whose emitter-collector electrodes are in series with the source 3$a$ and the gap G. A preliminary amplifying arrangement is constituted by a pair of transistors 4$d$ and 4$e$ whose emitter-collector electrodes lie in series with the source 3$a$ and the output resistor 4$f$ across which develops the signal for triggering the power transistors 4$a$ and 4$c$. The transistors 4$d$ and 4$e$ are, in turn, triggered by the application of a signal to the base of NPN transistor 4$g$ whose emitter is tied in parallel to the bases of transistors 4$d$ and 4$e$ and which has an emitter-collector network in series with the output resistors 4$h$ and the source 3$a$.

A resistor 6 is connected in series with the high-voltage auxiliary source 3$b$ to limit the current drain from this source at short circuiting of the gap. Furthermore, the circuit of FIG. 9, which is basically a modification of that of FIG. 7, includes a voltage-divider resistor 109 bridged across the electrodes 1, 2 to sense the gap condition, a diode 10$a$ connected to the output terminal 109$a$ of this resistor which produces the sensing signal across the terminal 109$a$, 109$b$. Through the rectifier 10$a$, the signal may charge a capacitor 10$b$ or, as illustrated, may be bucked against the charge of the capacitor delivered from source 14 via the variable charging resistor 10$e$, a zener diode 10$c$ being connected across capacitor 10$b$. The integrated signal can then be applied to the base of the transistor 11$a$ of a Schmitt trigger 11, the thresholds of which may be set at resistor 11$r$ as previously described. Moreover, the Schmitt trigger 11 has an output transistor 11$b$ which applies its signals to the amplifying and phase-reversal transistor 12, the latter in turn energizing the power switch 4 as previously described.

The sensing resistor 109 is provided with a multiplicity of taps 91, 92, 93 – 9$n$ adapted to be connected in circuit by the selector switch 23 which has the terminal 109$a$ to connect one or more of the taps in a voltage divider arrangement across the gap G. A switch 21 of a timer 20 controlling the motor M of the selector switch 23 is ganged with power switch 22 in series with the auxiliary source 3$b$ to initiate and terminate a machining operation depending upon whether the switches 21, 22 are open or closed. The timer 20 sets the selector switch 23 to connect the uppermost tap 91 at the start of machining and after a predetermined time interval, shifts the switch 23 to so connect the successively lower taps 92, 93–. The several taps serve to permit charging of the capacitor at different rates in accordance with the proportionality constant of the voltage divider network associated with the particular tap. The terminal voltage of capacitor 10$b$, when the tap 91 is in circuit, shows a sharper descending flank (FIG. 10) than the corresponding capacitor voltage for taps 92 and 93. Hence, the threshold $Vs'$ of the Schmitt trigger is reached more rapidly (time $t_{42}$) when tap 91 is in circuit than for taps 92 and 93 whose threshold time are represented at $t_{43}$ and $t_{44}$, respectively in FIG. 10. Thus, in the first stage switchover of the Schmitt circuit to render the power transistor 4 conductive may take place sooner in early stages and later during the last stages of machining, thereby increasing the machining rate at the beginning. In the first stage, for example, the gap voltage may build up to a level of 40 volts before breakdown with increase in potential to 50, 60, 70 and 80 volts in the second, third, fourth and last stages of the machining operation.

Since in the initial stage of machining, the removal of particles is more readily accomplished, it has been found that each pulse may be triggered with a relatively lower gap recovery voltage (without thermal arcing) while later stages are effected with higher potentials so that thorough deionization is assured.

EXAMPLE

Figures 10, 11, 12:
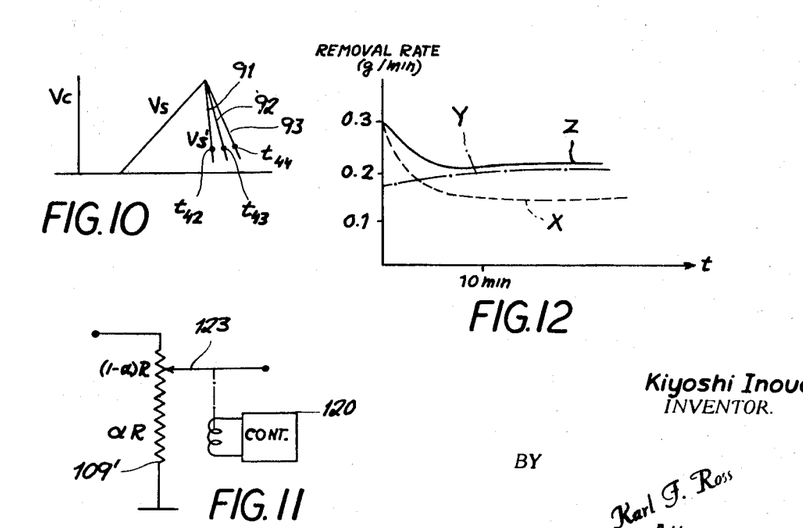
FIG. 10 is a graphic diagram showing the potential (plotted along the ordinate) versus time (plotted along the abscissa) of the cycle of analog signals under various conditions in the circuit of FIG. 9.
FIG. 11 is a detail view of a modification of the circuit of FIG. 9.
FIG. 12 is a graph illustrating a practical example using the circuit of FIG. 9.

In FIG. 12, I show the removal rate in terms of gr./min., plotted along the ordinate, against time plotted along the abscissa. The graph relates to the machining of an iron workpiece using "no wear" operating techniques with a copper electrode of 10 mm. in diameter to a surface roughness of 35 microns H(max). In this graph, the broken line X represents an adaptive machining system of the type characterizing the prior art while the dot-dash line Y represents the system obtained with the circuit of FIG. 7 and the solid line graph Z represents the results obtained with the circuit of FIG. 9 with voltage steps in the indicated increments across the gap.

In FIG. 11 there is shown a modification of the system of FIG. 9 wherein a wiper 123 sweeps the resistor 109' continuously rather than in steps under the control of a continuous timing drive 120 to delay the attainment of the threshold $V_s'$ with the course of machining. This system is essentially equivalent to that of FIG. 9.

I claim:

1. A method of machining a conductive workpiece comprising the steps of:
    a. spacedly juxtaposing an electrode with said workpiece across a discharge gap while passing a dielectric liquid therethrough;
    b. relatively displacing said electrode and said workpiece during the machining thereof to maintain the gap spacing generally constant;
    c. applying across said electrode and said workpiece a direct current arc-striking voltage sufficient to initiate discharge across said gap while permitting said voltage to build up thereacross to a level constituting a function of conductivity characteristics of said gap and to decay with discharge across said gap;
    d. deriving an analog signal representing the voltage build up and decay across said gap; and
    e. triggering a machining current flow through said gap across said electrode and said workpiece upon said signal exceeding a first threshold value and upon initiation of a discharge by said voltage, and terminating said machining current flow through said gap upon detection of a value of the analog signal declining to a second threshold value less than said first threshold value.

2. The method defined in claim 1, further comprising the steps of establishing a first digital condition upon said signal exceeding said first threshold value and a logically converse second digital condition upon said signal attaining said second threshold value; and switching a machining current source connected across said electrode and said workpiece on and off instantaneously in response to the establishment of said first and second conditions, respectively.

3. The method defined in claim 2 wherein said arc-striking voltage is applied across said electrode and said workpiece by a limited-current DC source connected across said gap in a closed-loop circuit therewith, said analog signal being derived by detecting the gap voltage and producing a sensed signal proportional thereto, and integrating said sensed signal to form said analog signal.

4. In the electric discharge machining of a conductive workpiece wherein an electric discharge machining electrode is spacedly juxtaposed with the workpiece across a machining gap flooded with a dielectric liquid coolant and a source of electric machining current is connectable across said electrode and said workpiece to pass an impulsive erosive electric discharge across said gap, the improvement which comprises the steps of:
    a. connecting said electrode, said gap and said workpiece in a closed-loop circuit with a limited-current voltage source;
    b. deriving an analog signal from said gap indicative of gap recovery from a preceding discharge and related to gap conductivity;
    c. producing with said analog signal at least one digital triggering signal upon said analog signal attaining a predetermined threshold value; and
    d. aperiodically triggering said source of machining current on and off instantaneously with said triggering signal, the analog signal being compared with at least one threshold value to produce a first digital state and with another threshold value less than the said one threshold value to produce a second digital state, one of said digital states corresponding to said digital triggering signal, said source of machining current being turned on and off in accordance with said digital states.

5. The improvement defined in claim 4 wherein said analog signal is derived in step b. by the steps of deriving a signal representing voltage buildup across said gap, and integrating the voltage-buildup signal by controlling the charge and discharge of a capacitor therewith to produce said analog signal.

6. The improvement defined in claim 5, further comprising the step of clipping said analog signal beyond a predetermined level thereof to prevent an excessive duration of triggering of said source of machining current.

7. A power supply for electrical discharge machining wherein a tool electrode is spacedly juxtaposed with a workpiece constituting a counterelectrode across a machining gap flooded with a dielectric liquid coolant, said power supply comprising:
    a main source of machining current including an electronically triggerable power switch connected in series with said electrodes and said gap;
    an auxiliary source of arc-striking voltage connected in a closed-loop arrangement with said gap for building up a voltage thereacross;
    sensing means including a voltage-dividing resistor having a pair of output terminals connected across said gap for producing an output indicative of the breakdown conditions of said gap;
    means including an integrating network having a capacitor bridged across said output terminals for forming an analog signal from said output related to the gap conditions;
    threshold gating means including a Schmitt trigger responsive to said analog signal for establishing a first digital state and a second digital state, said threshold gating circuit being connected to said power switch for substantially instantaneously rendering same conductive and terminating conductivity of said power switch upon the occurrence of said digital states respectively, said Schmitt trigger having an input transistor with a base connected to said capacitor.

8. The power supply defined in claim 7 wherein said power switch is a bank of power transistors connected in parallel between said main source and said electrodes and having bases triggerable in parallel by said threshold gating means.

9. A power supply for electrical discharge machining wherein a tool electrode is spacedly juxtaposed with a workpiece constituting a counterelectrode across a machining gap flooded with a dielectric liquid coolant, said power supply comprising:
    a main source of machining current including an electronically triggerable power switch connected in series with said electrodes and said gap;
    an auxiliary source of arc-striking voltage connected in a closed-loop arrangement with said gap for building up a voltage thereacross;
    sensing means including a voltage-dividing resistor having a pair of output terminals connected across said gap for producing an output indicative of the breakdown conditions of said gap;
    means including an integrating network having a capacitor bridged across said output terminals for forming an analog signal from said output related to the gap conditions; and
    threshold gating means including a Schmitt trigger responsive to said analog signal for establishing a first digital state and a second digital state, said threshold gating circuit being connected to said power switch for substantially instantaneously rendering same conductive and terminating conductivity of said power switch upon the occurrence of said digital states respectively, said Schmitt trigger having an input transistor with a base connected to said capacitor, and means establishing two threshold values for said Schmitt trigger effective to produce an output signal upon the voltage across said capacitor exceeding one of said threshold values and terminating said output signal upon the voltage across said capacitor attaining a second threshold value less than the first threshold value, the output signal of said Schmitt trigger being applied to said power switch for rendering same conductive.

10. The power supply defined in claim 9, further comprising amplifier means between said Schmitt trigger and said power switch.

11. The power supply defined in claim 9, further comprising an electronic breakdown device connected across said capacitor for clipping the voltage appearing thereacross upon the latter voltage exceeding a predetermined magnitude.

12. The power supply defined in claim 11 wherein said breakdown device is a Zener diode.

13. The power supply defined in claim 9, further comprising means including a source of direct current and a resistor in series with said capacitor and said source of direct current for charging said capacitor, said voltage divider being connected to said capacitor so as to buck the charging voltage supplied thereto through said resistor.

14. The power supply defined in claim 9, further comprising a rectifier diode connected between one of said output terminals and said capacitor.

15. The power supply defined in claim 9 wherein said main source of machining current includes a direct current source and a bank of power transistors in series with said direct current source and said electrode, and wherein said auxiliary source includes said direct current and a current-limiting resistor in series therewith connected across said electrodes.

16. The power supply defined in claim 9 wherein said major source includes a relatively low-voltage high-current DC source connected in series with a bank of power transistors across said electrodes and wherein said auxiliary source includes a relatively high-voltage low current DC source connected across said electrodes.

17. The power supply defined in claim 16, further comprising a rectifier diode connected in series with said low voltage high current DC source to block high voltage from said high-voltage low current DC source.

18. The power supply defined in claim 16, further comprising a current-limiting resistor in series with said high-voltage DC source.

19. The power supply defined in claim 9 further comprising means for adjusting the charging and discharging rate of said capacitor during the electrical discharge machining process.

20. The power supply defined in claim 19 wherein the last-mentioned means includes a plurality of taps of said voltage divider and sequence-switching means successively connecting said capacitor with said taps.

21. The power supply defined in claim 19 wherein said voltage divider is a variable resistor, the last-mentioned means including a wiper adapted to sweep along said variable resistor.

22. A power supply for electrical discharge machining wherein a tool electrode is spacedly juxtaposed with a workpiece constituting a counterelectrode across a machining gap flooded with a dielectric liquid coolant, said power supply comprising:
  a main source of machining current including an electronically triggerable power switch connected in series with said electrodes and said gap;
  an auxiliary source of arc-striking voltage connected in a closed-loop arrangement with said gap for building up a voltage thereacross;
  sensing means connected across said gap for producing an output indicative of the breakdown conditions of said gap;
  means forming an analog signal from said output related to the gap conditions;
  threshold gating means responsive to said analog signal for establishing a first digital state and a second digital state, said threshold gating circuit being connected to said power switch for substantially instantaneously rendering same conductive and terminating conductivity of said power switch upon the occurrence of said digital states respectively, said means forming said analog signal from said output including an integrating network connected between said sensing means and said threshold gating means, said sensing means including a voltage divider connected between said electrodes across said gap and having output terminals connected to said integrating network, said integrating network including at least one capacitor in circuit with said output terminals and chargeable at a rate controlled by a potential appearing across said output terminals, said threshold gating means including a Schmitt trigger circuit having an input connected to said capacitor and means establishing two threshold values for said Schmitt trigger circuit effective to produce an output signal upon the voltage across said capacitor exceeding one of said threshold values and terminating said output signal upon the voltage across said capacitor attaining the second threshold value, the output signal of said Schmitt trigger circuit being applied to said power switch for rendering the same conductive; and
  a timer for connecting sequentially successive portions of said voltage divider in circuit with said capacitor for adjusting the charging and discharging rate of said capacitor during the electrical discharge machining process.

23. The power supply defined in claim 22, further comprising a plurality of taps of said voltage divider and sequence-switching means including said timer successively connecting said capacitor with said taps.

24. The power supply defined in claim 22, further comprising amplifier means between said Schmitt trigger circuit and said power switch.

25. The power supply defined in claim 22, further comprising an electronic breakdown device connected across said capacitor for clipping the voltage appearing thereacross upon the latter voltage exceeding a predetermined magnitude.

26. The power supply defined in claim 25 wherein said breakdown device is a Zener diode.

27. The power supply defined in claim 22, further comprising means including a source of direct current and a resistor in series with said capacitor and said source of direct current for charging said capacitor, said voltage divider being connected to said capacitor so as to buck the charging voltage supplied thereto through said resistor.

28. The power supply defined in claim 22, further comprising a rectifier diode connected between one of said output terminals and said capacitor.

29. The power supply defined in claim 22 wherein said main source of machining current includes a direct current source and a bank of power transistors in series with said direct current source and said electrodes, and wherein said auxiliary source includes said direct current source and a current-limiting resistor in series therewith connected across said electrodes.

30. The power supply defined in claim 22 wherein said major source includes a relatively low voltage high-current DC source connected in series with a bank of power transistors across said electrodes and wherein said auxiliary source includes a relatively high-voltage low-current DC source connected across said electrodes.

31. The power supply defined in claim 30, further comprising a rectifier diode connected in series with said low-voltage high-current source to block high voltage from said low-current DC source.

32. The power supply defined in claim 30, further comprising a current-limiting resistor in series with said high-voltage DC source.

33. A power supply for electrical discharge machining wherein a tool electrode is spacedly juxtaposed with a workpiece constituting a counterelectrode across a machining gap flooded with a dielectric liquid coolant, said power supply comprising:
  a main source of machining current including an electronically triggerable power switch connected in series with said electrodes and said gap;

an auxiliary source of arc-striking voltage connected in a closed-loop arrangement with said gap for building up a voltage thereacross;

sensing means connected across said gap for producing an output indicative of the breakdown conditions of said gap;

means forming an analog signal from said output related to the gap conditions; and threshold gating means responsive to said analog signal for establishing a first digital state and a second digital state, said threshold gating circuit being connected to said power switch for substantially instantaneously rendering same conductive and terminating conductivity of said power switch upon the occurrence of said digital states respectively, said means forming said analog signal from said output including an integrating network connected between said sensing means and said threshold gating means, said sensing means including a voltage divider connected between said electrodes across said gap and having output terminals connected to said integrating network, said integrating network including at least one capacitor in circuit with said output terminals and chargeable at a rate controlled by a potential appearing across said output terminals, said threshold gating means including a Schmitt trigger circuit having an input connected to said capacitor and means establishing two threshold values for said Schmitt trigger circuit effective to produce an output signal upon the voltage across said capacitor exceeding one of said threshold values and terminating said output signal upon the voltage across said capacitor attaining the second threshold values, the output signal of said Schmitt trigger circuit being applied to said power switch for rendering same conductive, said Schmitt trigger circuit including a first transistor connected to said capacitor and a second transistor connected to said first transistor and producing said output signal of the Schmitt trigger circuit, said means establishing said threshold values including at least one variable resistor connected in circuit with at least one of said transistors, said capacitor being a variable condenser.

34. The power supply defined in claim 33 wherein said power switch is a bank of power transistors connected in parallel between said main source and said electrodes and having bases triggerable in parallel by said threshold gating means.

35. The power supply defined in claim 33, further comprising amplifier means between said Schmitt trigger circuit and said power switch.

36. The power supply defined in claim 33, further comprising an electronic breakdown device connected across said capacitor for clipping the voltage appearing thereacross upon the latter voltage exceeding a predetermined magnitude.

37. The power supply defined in claim 36 wherein said breakdown device is a Zener diode;

38. The power supply defined in claim 33, further comprising means including a source of direct current and a resistor in series with said capacitor and said source of direct current for charging said capacitor, said voltage divider being connected to said capacitor so as to buck the charging voltage supplied thereto through said resistor.

39. The power supply defined in claim 33, further comprising a rectifier diode connected between one of said output terminals and said capacitor.

40. The power supply defined in claim 33 wherein said main source of machining current includes a direct current source and a bank of power transistors in series with said direct current source and said electrodes, and wherein said auxiliary source includes said direct current source and a current-limiting resistor in series therewith connected across said electrodes.

41. The power supply defined in claim 33 wherein said major source includes a relatively low-voltage high-current DC source connected in series with a bank of power transistors across said electrodes and wherein said auxiliary source includes a relatively high-voltage low-current DC source connected across said electrodes.

42. The power supply defined in claim 41, further comprising a rectifier diode connected in series with said low-voltage high-current source to block high voltage from said low current DC source.

43. The power supply defined in claim 41, further comprising a current-limiting resistor in series with said high-voltage DC source.

44. The power supply defined in claim 33, further comprising means for adjusting the charging and discharging rate of said capacitor during the electrical discharge machining process.

45. The power supply defined in claim 44 wherein the last-mentioned means includes a plurality of taps of said voltage divider and sequence-switching means successively connecting said capacitor with said taps.

46. The power supply defined in claim 44 wherein said voltage divider is a variable resistor, the last-mentioned means including a wiper adapted to sweep along said variable resistor.

47. The power supply defined in claim 44 wherein the last-mentioned means includes a timer for connecting sequentially successive portions of said voltage divider in circuit with said capacitor.